Aug. 1, 1950   Y. Z. VON STACKELBERG   2,517,061
VALVE
Filed March 9, 1945
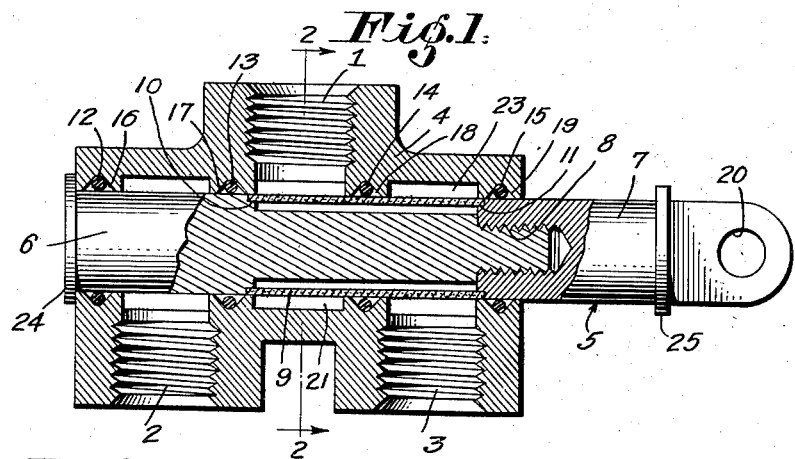
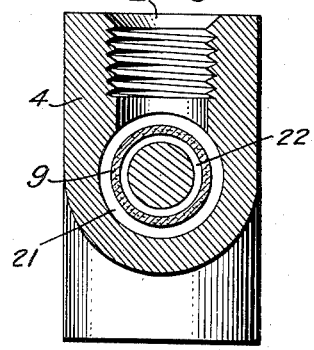
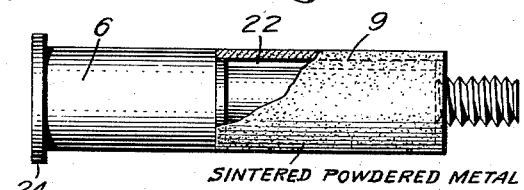
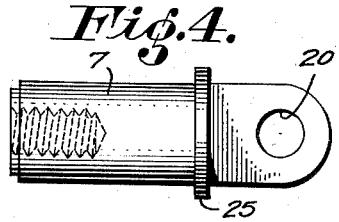
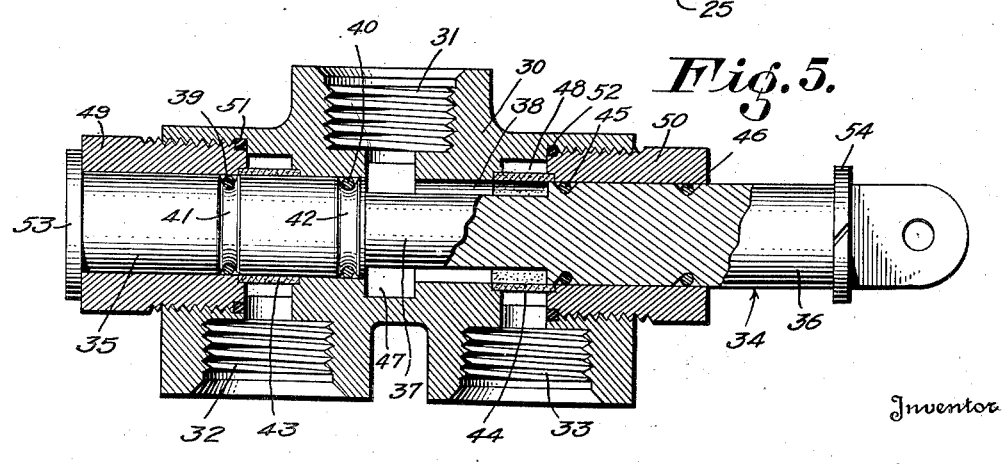
Inventor
Yurgen Z. von Stackelberg
By Donald W. Farrington
Attorney Patented Aug. 1, 1950

2,517,061

UNITED STATES PATENT OFFICE 2,517,061

VALVE

Yurgen Z. von Stackelberg, Baltimore, Md., assignor to The Glenn L. Martin Company, Middle River, Md., a corporation of Maryland Application March 9, 1945, Serial No. 581,744

10 Claims. (Cl. 251—76)

This invention relates to a novel valve, particularly to an arrangement of structure and seals to prevent internal flow or leakage between the ports or flow paths within a multi-port valve.

In high pressure hydraulic systems involving pressures from 1,500 to 3,000 pounds per square inch, it is a difficult problem to maintain the structural parts within the valve sealed to prevent internal flow or leakage during the operation of the valve. By this is meant, that the primary purpose of a multi-port valve is to permit flow through one or the other paths through the valve. A selector valve, for example, may have one inlet port and two outlet ports so that flow may be directed from the inlet port to either of the two outlet ports or it may have two inlet ports from two separate sources of fluid pressure and a single outlet port through which fluid will flow from either of the two sources of fluid pressure depending upon the position of the selector valve. It is necessary to prevent flow of hydraulic fluid past the valve structure to the closed line. In high pressure valves of this type, it has been necessary to resort to poppet valves or ball valves in an effort to overcome the problem of sealing the internal structure of a valve to prevent inadvertent internal leakage of fluid. Poppet valves and ball valves, are usually arranged so that they open against fluid pressure and can be maintained sealed because the fluid pressure helps seat the valves but flow through such a valve is directional, that is, a flow control valve employing poppet valves is not reversible as far as the direction of flow therethrough is concerned. Furthermore, some expedient must be employed in the valve structure to facilitate opening the valve against the pressure in the system.

By this invention, the excellent sealing properties of the O-ring seal can be employed to seal the internal structure of a valve against undesirable leakage. The O-ring seal referred to is a type of seal commonly used in high pressure systems wherein a shaft or any other part of circular cross-section passing through an opening in a cylinder, valve or any other hydraulic fitting can be sealed in spite of generous clearance which permits relative motion of the shaft and the surrounding structure. This is accomplished by having a groove in either the shaft or the adjacent wall and an annular gasket of generally circular cross-section in the groove, the dimensions of the annular gasket being such as to form a snug fit, if the groove is in the wall—with the shaft, or if the groove is in the shaft—with the wall. These O-rings are made of soft rubber or rubber-like synthetic material and are of generally circular cross-section. They are sufficiently elastic so that they may be placed in the grooves over the valve body or fit snugly around the valves when in the grooves. This O-ring in a groove forms an excellent fluid-tight seal and prevents any leakage under high pressures past such a seal. Due to the fact that part of the sealing properties are derived from the snug fit between the O-ring and the adjacent part, it has been impossible to date to have a satisfactory fluid-tight seal in a structure where there is relative motion between a shoulder or sharp edge and the O-ring seal. In other words, if the O-ring is in a groove in the wall of the structure surrounding a shaft, the shaft must be of constant diameter without any breaks where it passes over the seal, and conversely if the O-ring is in a groove in a shaft, it will not pass over the sharp edge or break in the adjacent wall structure. The reason for this is that any sharp edges, due to change in diameter, tend to destroy or impair the external contour of the gasket and ruin its efficiency for further sealing.

An object of this invention is to provide a structure whereby O-rings may be employed to perform the function of sealing a valve against internal leakage, yet wherein the rings will not be subjected to wear or destruction by passing over sharp edges in the valve structure. This invention is illustrated in a selector valve which demonstrates in a typical valve application the important structural elements for carrying out this invention, but it is obvious from a consideration of the selector valve that almost any type of multi-flow control valve might be designed embodying this principle to prevent internal leakage.

By this invention, an internally sealed valve is provided for a high pressure system in which very low power is required to open the valve. The fluid pressure in this construction is not relied upon to work against any moving part for sealing and, therefore, the only power required to operate this valve is that power necessary to overcome the snug fit of the sealing gasket for the adjacent part. The valve of this construction will slide freely, unimpeded by the fluid pressure, working against only the friction of the gasket.

A valve made according to the teaching of this invention will be effective to eliminate vibration or "water hammer" in the hydraulic system.

Further and other objects will become apparent from the description of the accompanying drawings which form a part of this disclosure and in which like numerals refer to like parts.

In the drawings:

Figure 1 is a sectional view of an embodiment of the invention in a hydraulic selector valve.

Figure 2 is a section taken on the line 2—2 of Figure 1.

Figure 3 is an elevation of one portion of the valve member with the sintered metal sleeve broken away.

Figure 4 is an elevation of the other portion of the valve member.

Figure 5 is a sectional view of a modification of the valve shown in Figure 1 embodying the invention.

For the purpose of illustrating an application of the invention, Figure 1 of the drawing shows a selector valve having fluid flow ports 1, 2 and 3. Port 1 may be employed as an outlet for fluid under pressure in which case, ports 2 and 3 are inlets from separate fluid pressure sources to the valve when so used. For example, port 3 might be connected to the normal fluid pressure source such as the conventional motor-driven pump. Port 2 would be connected to an emergency source of fluid pressure such as an accumulator or hand pump. Port 1 would then be connected to the equipment such as a cylinder to be actuated by the fluid pressure.

The selector valve comprises housing 4 in which are formed ports 1, 2, and 3. The valve 5 is an assembly of portions 6 and 7 that are separably connected, such as by screw threads 8. A cylindrical porous unit 9 is retained between portions 6 and 7 in grooves 10 and 11. O-rings 12, 13, 14 and 15 are located in grooves 16, 17, 18 and 19 formed in housing 4. The clearance around valve 5 as it extends through the wall structure of housing 4 is such that a sliding fit is provided between these parts. The O-ring seals in the groove are so calculated that they afford a fluid-tight fit between the groove and the valve. Hole 20 formed in portion 7 permits the connection of a suitable linkage for a manual or servo control to operate the selector valve.

The cylindrical member is formed from powdered metal put through a sintering process to form a mechanically strong self-supporting, unitary structure. Such material is commercially available under the trade name of Porex, manufactured by Moraine Products Division of General Motors Corp. This material is produced by having particles of metal of a selected size put through a sintering process whereby the particles adhere and form a porous mass. By selecting the size of the particles, the pore size of the sintered mass can be controlled. The particle size and wall thickness determine the mechanical strength of cylinder 9. The wall thickness and pore size also determine the resistance to the flow of fluid through the cylinder and therefore the differential in pressure. In practice, the particles size can be anything that will give a pore opening at the surface less than .015" and not interpose an objectionable restriction on the flow of fluid. It has been determined that pits of .015" or less will not harm the O-ring seal, that is, the seals will slide freely over pits or cracks of this width and not suffer any abrasion. Porous cylinder 9 can be machined and finished so that the length can be controlled with close tolerances to fit between the shoulders of grooves 10 and 11 and the external periphery of the cylinder forms a smooth and continuous cylindrical surface throughout the length of the valve 5.

The tolerance on the overall length of member 9 can be held so that it exactly and snugly fits on shoulders of grooves 10 and 11 so that the assembly valve consisting of parts 6, 7 and 9 present an external cylindrical surface which for all positions of the valve supports the O-ring seal in its normal operative position. Member 9 is sufficiently porous so that by keeping the wall thickness between predetermined limits, the pressure drop across this unit is very low so the flow between, for example, ports 1 and 3 when the valve is in the position shown in Figure 1, will be within the limits specified for such a valve. The fluid under pressure will flow, for example, in port 1 into annular chamber 21 through porous member 9 into annular space 22 and flow again through porous member 9 into annular space 23 and out through port 3. When valve assembly 5 is moved to a position to interconnect ports 1 and 2, O-ring seals 14 and 15 engage the solid wall of member 7 and cut off any flow internally of the valve from port 1 to port 3. In the position shown in Figure 1, port 2 is cut off from any leakage or seepage from the fluid flowing between ports 1 and 3 by seal 13. It can be readily seen from Figure 1 that when the flow is shifted from the position shown to a path between ports 1 and 2 as valve assembly 5 is moved to the left, the O-ring seals 13 and 14 slide over porous member 9 and are continually supported thereby until the ultimate position of the valve is reached, at which time seal 14 prevents any flow into the line connected to part 3. Stops 24 and 25 on valve assembly 5 limit the axial travel of the valve through the housing.

The valve shown in Figure 5 embodies substantially the same invention shown in Figure 1 but illustrates how the invention may be carried out by the use of the O-ring seals mounted on the valve rather than in the housing structure. This construction is sometimes preferred because it is easier to turn and polish the grooves around the external periphery of the valve rather than in the internal periphery of a hole in a wall structure. Valve body 30 is formed with ports 31, 32 and 33. Valve assembly 34 consists of right hand portion 36 and left hand portion 35 interconnected by portion 37 which is of reduced diameter and affords an annular passage 38 for the flow of fluid between ports 31 and 33 when the valve is in the position shown in Figure 5. O-ring seals 39 and 40 are placed in grooves 41 and 42 so that they span the porous seal-supporting sleeve 43. Similar seals 45 and 46 will span porous sleeve 44 when the valve is moved in the opposite direction. It will be seen from a consideration of this drawing that when the valve is in the position shown so that fluid may flow from ports 31 to 33, internal leakage or seepage to port 32 will be prevented by seal 40. When the valve is in the position shown, fluid will flow from port 31 to annular chamber 47 through annular space 38 through porous member 44 into annular chamber 48 to port 33. When the valve is in the alternate position, seal 45 will prevent internal leakage between ports 31 and 33 when fluid is flowing from port 31 to port 32. The valve body 30 has guides 49 and 50 threaded into the ends thereof. Annular seals 51 and 52 at the ends of members 49 and 50 render the threaded joint fluid-tight. Porous members 43 and 44 are retained by members 49 and 50 in annular grooves in the valve body and members 49 and 50. The tolerances and fits of the parts are such that member 49, sleeve 43, valve body 30 and sleeve 44 and the opening in member 50 provides a bore through which valve 34 slides with a sliding fit, said bore affording a continuous and smooth support for the O-ring seals throughout the length of their path of travel. Flange 53 and snap ring 54 in a groove in member 36 provides stops to limit the axial travel of the valve through the housing.

Valves made according to this invention will effectively eliminate the vibration commonly called "water hammer," due to the kinetic energy of the flow of fluid. The pores of members 9, 43 and 44 each permit only restricted flow, but the porous members afford many parallel flow paths so as not to offer undue resistance to the flow of fluid, and it has been found in systems having fluid flow so restricted that "water hammer" or vibration is eliminated. This is an additional advantage derived from this improved valve construction.

It will further be noted that in the arrangement of structure shown in Figure 1, the porous member 9 is self-cleaning as the flow is reversed as the valve is moved. The units in Figure 5 can readily be cleaned by reverse flow if cleaning is found to be necessary.

It is to be understood that certain changes, alterations, modifications and substitutions can be made without departing from the spirit and scope of the appended claims.

I claim as my invention:

1. In a valve comprising a body having inlet and outlet chambers formed therein, a bore formed in the wall between said chambers, a valve member having a cylindrical portion extending through said bore and mounted for axial motion to control the flow of fluid through said bore, a groove in the wall of said bore surrounding said valve member, an annular sealing gasket in said groove engaging the outer periphery of said valve member, a sleeve of fine grain porous material secured to the end of said valve member, the outer periphery thereof forming a smooth continuation of the outer periphery of said valve member so that said porous sleeve supports said gasket in said groove as said valve member is withdrawn from the bore to permit fluid from said inlet chamber through and within said sleeve and out through said sleeve to said outlet chamber.

2. In a valve comprising a valve body having inlet and outlet chambers formed therein, a bore formed in the wall between said chambers, a cylindrical valve member mounted in said bore to move therethrough with a sliding fit, a groove formed in the wall of said bore, an annular elastic gasket positioned within said groove surrounding said valve, a porous sleeve member mounted to form a smooth extension of the cylindrical surface of said valve, said porous sleeve member moving with said valve as the valve is withdrawn from the bore past said gasket to afford a support for said annular elastic gasket but permit the flow of fluid therethrough from the inlet to the outlet chamber.

3. In a flow control valve comprising a valve body having inlet and outlet chambers formed therein, a bore formed in the wall between said chambers, a cylindrical valve member mounted in said bore to move therethrough to control the flow of fluid, a groove formed in the wall of said bore, an annular elastic gasket of generally circular cross section positioned within said groove surrounding said valve, a porous sleeve member mounted to form a smooth extension of a cylindrical surface of said valve, said porous sleeve formed from sintered granular metal of selected grain size to control the size of the pores in said sleeve, said porous sleeve member following said valve as the valve is withdrawn from the bore to afford a support for said annular elastic gasket but permit the flow of fluid therethrough from the inlet to the outlet chamber.

4. A flow control valve comprising a body having inlet and outlet chambers formed therein, a bore formed in the wall between said chambers, a valve member having a cylindrical portion extending through said bore and mounted for axial motion to control the flow of fluid through said bore, a V-groove in the wall of said bore surrounding said valve member, an annular sealing gasket in said groove engaging the outer periphery of said valve member, a hollow cylindrical member of fine grain porous material secured in abutting relation to the end of said valve member, the outer periphery thereof forming a smooth continuation of said valve member so that said porous member supports said gasket in said groove as said valve member is withdrawn from the bore to permit fluid from said inlet chamber through and within said sleeve and out through said sleeve to said outlet chamber.

5. A valve comprising a valve body having inlet and outlet chambers formed therein, a bore formed in the wall between said chambers, a cylindrical valve member mounted in said bore to move therethrough with a sliding fit, a groove formed in the wall of said bore, an annular elastic gasket positioned within said groove surrounding said valve, a porous sleeve member having surface pore openings of less than .015" mounted to form an extension of the cylindrical surface of said valve, said porous sleeve member moving with said valve as the valve is withdrawn from the bore past said gasket to afford a support for said annular elastic gasket but permit the flow of fluid therethrough from the inlet to the outlet chamber.

6. A flow control valve comprising a valve body having inlet and outlet chambers formed therein, a passage formed in a wall between said chambers, a cylindrical valve member mounted in said passage to control the flow of fluid therethrough, an annular groove formed in the wall of said passage, an annular elastic gasket positioned within said groove surrounding said valve, a porous sleeve member mounted to form an extension of a cylindrical surface of said valve, said porous sleeve formed from sintered granular metal of selected grain size to control the size of the pores in said sleeve, said porous sleeve member following said valve as the valve is withdrawn from said passage to afford a support for said annular elastic gasket but permit the flow of fluid therethrough from the inlet to the outlet chamber.

7. In a valve comprising a body member having inlet and outlet chambers, a bore formed in the wall between said chambers providing a flow path from said inlet to said outlet chambers, a cylindrical valve member movable through said bore to control the flow of fluid therethrough, an annular sealing gasket carried by one of said members and arranged to engage the other member to render the valve fluid tight when the valve member is in the closed position, and a cylindrical, porous sleeve carried by the other member and interposed in the path of the flow of fluid so constructed and arranged to form a support for said sealing gasket to retain said annular gasket in place as said valve member is withdrawn from said bore.

8. In a valve comprising a body member having inlet and outlet chambers, a bore extending through the partition wall between said chambers, a cylindrical valve member extending through said bore and said chambers and axially movable for controlling the flow of fluid between said chambers, said cylindrical valve member having an intermediate portion of reduced diameter of an axial length greater than the thickness of said partition wall, an annular sealing gasket carried by one of said members and interposed between the wall of said bore and said valve member to seal the same against the passage of fluid in one position of said valve member, and a cylindrical, porous sleeve carried by the other member and interposed in the path of the flow of fluid so constructed and arranged to form a support for said sealing gasket to retain said annular gasket in place as said valve is withdrawn to a position wherein the undercut portion of said valve spans said partition wall.

9. A valve comprising a body having inlet and outlet chambers, a bore extending through the outside walls and the partition wall between said chambers, a cylindrical valve member extending through said bore and said chambers, a porous sleeve member mounted in said outlet chamber forming the inner wall thereof, the internal face of said sleeve forming a continuation of said bore, an annular sealing gasket mounted in a groove in the periphery of said valve member sealing the space between said valve member and the bore in said partition wall when the valve is in closed position, said porous sleeve forming a retainer and support for said gasket in said groove as the valve member is withdrawn from the bore in the partition wall to permit the flow of fluid therethrough to said outlet chamber.

10. A valve comprising a valve body having inlet and outlet chambers formed therein, a bore formed in the wall between said chambers, a cylindrical valve member mounted in said bore to move therethrough with a sliding fit, sealing means to prevent flow of fluid past the valve when in the closed position, a porous sleeve member mounted to form a smooth extension of the cylindrical surface of said valve, said porous sleeve member moving with said valve through said wall as the valve is withdrawn from the bore to permit the flow of fluid therethrough from the inlet to the outlet chamber.

YURGEN Z. von STACKELBERG.

REFERENCES CITED

The following references are of record in the file of this patent:

UNITED STATES PATENTS

| Number | Name | Date |
|---|---|---|
| 651,334 | Baker | June 12, 1900 |
| 1,111,244 | Wilson | Sept. 22, 1914 |
| 1,988,545 | Donn | Jan. 22, 1935 |
| 2,132,030 | Hunt | Oct. 4, 1938 |
| 2,297,817 | Truxell | Oct. 6, 1942 |
| 2,360,733 | Smith | Oct. 17, 1944 |

FOREIGN PATENTS

| Number | Country | Date |
|---|---|---|
| 190,561 | Great Britain | of 1922 |